United States Patent
Ogihara et al.

(10) Patent No.: US 10,461,378 B2
(45) Date of Patent: Oct. 29, 2019

(54) METHOD FOR PRODUCING LITHIUM ION SECONDARY BATTERY

(71) Applicant: Nissan Motor Co., Ltd., Yokohama-shi, Kanagawa (JP)

(72) Inventors: Wataru Ogihara, Kanagawa (JP); Hideaki Tanaka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 204 days.

(21) Appl. No.: 15/101,427

(22) PCT Filed: Dec. 8, 2014

(86) PCT No.: PCT/JP2014/082467
§ 371 (c)(1),
(2) Date: Jun. 3, 2016

(87) PCT Pub. No.: WO2015/104935
PCT Pub. Date: Jul. 16, 2015

(65) Prior Publication Data
US 2016/0308258 A1    Oct. 20, 2016

(30) Foreign Application Priority Data

Jan. 9, 2014  (JP) ................................. 2014-002499

(51) Int. Cl.
*H01M 10/44* (2006.01)
*H01M 4/505* (2010.01)
(Continued)

(52) U.S. Cl.
CPC ....... *H01M 10/446* (2013.01); *H01M 2/1653* (2013.01); *H01M 4/0404* (2013.01);
(Continued)

(58) Field of Classification Search
CPC ............. H01M 10/446; H01M 2/1653; H01M 4/0404; H01M 4/0445; H01M 4/131;
(Continued)

(56) References Cited

U.S. PATENT DOCUMENTS 9,997,803 B2     6/2018  Yonezawa
2005/0048374 A1* 3/2005  Yonezawa ......... H01M 10/0525
                                                 429/309
(Continued)

FOREIGN PATENT DOCUMENTS

CN         1309114 C      4/2007
CN       101809805 A      8/2010
(Continued)

OTHER PUBLICATIONS

Jeon, Bup Ju, Sung Won Kang, and Joong Kee Lee. "Electrochemical characteristics of silicon coated graphite prepared by gas suspension spray method for anode material of lithium secondary batteries." Korean Journal of Chemical Engineering 23.5 (2006): 854-859. (Year: 2006).*

(Continued)

*Primary Examiner* — Cynthia K Walls
(74) *Attorney, Agent, or Firm* — Global IP Counselors, LLP (57) ABSTRACT

A method for producing a lithium ion secondary battery comprising the positive electrode active material of formula (1), $Li_{(2-0.5x)}Mn_{1-x}M_{1.5x}O_3$ (x satisfies 0<x<1) ... (1) (M in the formula is a lithium-containing transition metal oxide expressed by $Ni_aCo_bMn_cM1_d$ (in which 0<a≤0.5, 0≤b≤0.33, 0<c≤0.5, and 0≤d≤0.1 are satisfied, the sum of a, b, c, and d becomes 1, and M1 in the formula is an element selected from Li, V, Al, Zr, Ti, Nb, Fe, Cu, Cr, Mg, and Zn)). The method comprises a step to repeat charge-discharge multiple times (charge-discharge interval), and comprises a step to (Continued)

discharge a at a lower current density than the current density during charge a, during the discharge of the multiple charges-discharges, or, a step to discharge b at a lower current density than the current density during charge a after the electromotive force is naturally recovered by idle b after each charge-discharge.

12 Claims, 4 Drawing Sheets

(51) Int. Cl.

| | |
|---|---|
| *H01M 4/525* | (2010.01) |
| *H01M 4/04* | (2006.01) |
| *H01M 4/1391* | (2010.01) |
| *H01M 2/16* | (2006.01) |
| *H01M 4/131* | (2010.01) |
| *H01M 4/134* | (2010.01) |
| *H01M 4/1393* | (2010.01) |
| *H01M 4/36* | (2006.01) |
| *H01M 4/38* | (2006.01) |
| *H01M 4/48* | (2010.01) |
| *H01M 4/587* | (2010.01) |
| *H01M 4/62* | (2006.01) |
| *H01M 4/66* | (2006.01) |
| *H01M 10/0525* | (2010.01) |
| *H01M 10/0568* | (2010.01) |
| *H01M 10/0569* | (2010.01) |
| *H01M 10/052* | (2010.01) |
| *H01M 4/02* | (2006.01) |

(52) U.S. Cl.
CPC ......... *H01M 4/0445* (2013.01); *H01M 4/131* (2013.01); *H01M 4/134* (2013.01); *H01M 4/1391* (2013.01); *H01M 4/1393* (2013.01); *H01M 4/364* (2013.01); *H01M 4/386* (2013.01); *H01M 4/483* (2013.01); *H01M 4/505* (2013.01); *H01M 4/525* (2013.01); *H01M 4/587* (2013.01); *H01M 4/623* (2013.01); *H01M 4/661* (2013.01); *H01M 10/0525* (2013.01); *H01M 10/0568* (2013.01); *H01M 10/0569* (2013.01); *H01M 10/052* (2013.01); *H01M 2004/027* (2013.01); *H01M 2004/028* (2013.01); *H01M 2220/20* (2013.01); *H01M 2300/0037* (2013.01)

(58) Field of Classification Search
CPC .. H01M 4/134; H01M 4/1391; H01M 4/1393; H01M 4/364; H01M 4/386; H01M 4/483; H01M 4/505; H01M 4/525; H01M 4/587; H01M 4/623; H01M 4/661; H01M 10/0525; H01M 10/0568; H01M 10/0569; H01M 10/052; H01M 2004/027; H01M 2004/028; H01M 2220/20; H01M 2300/0037

See application file for complete search history.

(56) References Cited

U.S. PATENT DOCUMENTS

| | | | | |
|---|---|---|---|---|
| 2007/0065728 | A1* | 3/2007 | Zhang | H01M 4/134 429/326 |
| 2010/0035146 | A1* | 2/2010 | Fujii | H01M 10/0525 429/200 |
| 2010/0207583 | A1* | 8/2010 | Tanaka | H01M 4/525 320/134 |
| 2012/0244425 | A1* | 9/2012 | Tokuda | H01M 4/5825 429/199 |
| 2013/0337332 | A1* | 12/2013 | Ito | H01M 4/505 429/223 |
| 2014/0065464 | A1* | 3/2014 | Masarapu | H01M 4/134 429/149 |

FOREIGN PATENT DOCUMENTS

| | | | |
|---|---|---|---|
| JP | 9-55211 A | | 2/1997 |
| JP | 2001068162 A | * | 3/2001 |
| JP | 2009-170348 A | | 7/2009 |
| JP | 2010-282874 A | | 12/2010 |
| JP | 2012185913 A | * | 9/2012 |
| JP | 2012186035 A | * | 9/2012 |
| KR | 10-2011-0022556 A | | 3/2011 |
| WO | WO-2012121062 A1 | * | 9/2012 ............ H01M 4/505 |

OTHER PUBLICATIONS

Certified Human English translation of JP 2012185913 A (Year: 2012).*

English machine translation of Ito et al. (JP 2012186035 A) (Year: 2012).*

English machine translation of Matsui et al. (JP 2001068162 A) (Year: 2001).*

* cited by examiner

METHOD FOR PRODUCING LITHIUM ION SECONDARY BATTERY

CROSS-REFERENCE TO RELATED APPLICATIONS

This application is a U.S. National stage application of International Application No. PCT/JP2014/082467, filed Dec. 8, 2014, which claims priority to Japanese Application No. 2014-002499, filed Jan. 9, 2014.

BACKGROUND

Field of the Invention

The present invention relates to a method for producing a lithium ion secondary battery.

Background Information

In recent years, the use of various electric vehicles has been promoted with the expectation of solving environmental/energy issues. Secondary batteries are being developed intensively as a vehicle-mounted power source, such as a motor drive power source, which holds the key to the practical application of these electric vehicles. However, in order to ensure widespread use, it is necessary to increase the performance and reduce the cost of batteries. In addition, with an electric vehicle, it is necessary to bring the single-charge driving range closer to that of a gasoline engine vehicle. Thus, batteries with higher energy are in demand.

In order for batteries to have a high energy density, it is necessary to increase the amount of electricity that can be stored per unit mass of the positive electrode and the negative electrode. So-called solid solution positive electrode active materials are being evaluated as a positive electrode material that has the potential to meet this requirement. Among the above, a solid solution of layered $Li_2MnO_3$, which is electrochemically inactive, and $LiMO_2$ (here, M is a transition metal such as Co and Ni), which is electrochemically active, are expected to be high-capacity positive electrode material candidates that can exhibit a large electric capacity exceeding 200 mAh/g (for example, refer to Japanese Laid-Open Patent Application No. 9-55211); pg. 1, line 7 of [0003].

SUMMARY

However, with the solid solution positive electrode active material using $Li_2MnO_3$, which is a high-capacity positive electrode material candidate disclosed in the above-described Japanese Laid-Open Patent Application No. 9-55211, there is the problem that, while the discharge capacity is large, the cycle features are poor if used under high charge-discharge potential, leading to easy deterioration upon repeated charge-discharge. Consequently, there is the problem that, even in a lithium ion battery that uses such a solid solution positive electrode active material as a high-capacity positive electrode, cycle durability is poor under high capacity use conditions, quickly leading to deterioration when charge-discharge is carried out at high potential.

Therefore, the object of the present invention is to provide a method for producing a secondary battery that is high-capacity and that is capable of suppressing degradation even when charge-discharge is carried out at high potential.

The present invention, which achieves the object above, is a method for producing a lithium ion secondary battery comprising a solid solution positive electrode active material represented by the following composition formula (1).

$$Li_{(2-0.5x)}Mn_{1-x}M_{1.5x}O_3 \text{ ($x$ satisfies } 0<x<1) \quad (1)$$

In formula (1), M is a lithium-containing transition metal oxide expressed by $Ni_aCo_bMn_cM1_d$ (in which $0<a\leq0.5$, $0\leq b\leq0.33$, $0<c\leq0.5$, and $0\leq d\leq0.1$ are satisfied, the sum of a, b, c, and d becomes 1, and M1 in the formula is an element selected from Li, V, Al, Zr, Ti, Nb, Fe, Cu, Cr, Mg, and Zn).

The first production method comprises a Step (a) for repeating charge-discharge multiple times. The method is also characterized by comprising a Step (b) in which discharge is carried out at a lower current density than the current density during charging, during each discharge of the multiple charges-discharges.

The second production method comprises a Step (a) for repeating charges-discharges multiple times. The method is also characterized by comprising a Step (b) in which discharge is carried out at a lower current density than the current density during charging that is carried out after the electromotive force is naturally recovered by standing idle after each discharge of the multiple charges-discharges.

According to the present invention, an activation treatment is carried out in a lithium ion secondary battery using a lithium-containing transition metal oxide represented by formula (1). In the first production method, charge-discharge is repeated multiple times, and discharge is carried out at a lower current density than the current density during charging, during each discharge of the multiple charges-discharges. In addition, in the second production method, charge-discharge is repeated multiple times, then left to stand idle after each discharge of the multiple charges-discharges to allow natural recovery of the electromotive force. Then, the electricity that is stored by this natural recovery is discharged at a lower current density than the current density during charging. By activating a lithium ion secondary battery using these production methods, it is possible to increase the amount of lithium ions that return to the positive electrode active material even when using a solid solution positive electrode active material having $Li_2MnO_3$ as the parent structure, and to promote stabilization of the crystal structure. Accordingly, the surface structure of the positive electrode active material is stabilized, to thereby suppress deterioration of the battery. Therefore, it is possible to suppress deterioration of the battery even if a high-capacity battery is subjected to charge-discharge at high potential.

DETAILED DESCRIPTION OF THE EMBODIMENTS

Embodiments of the present invention will be explained below, with reference to the appended drawings. In the explanations of the drawings, the same elements are given the same reference characters, and overlapping explanations are omitted. The dimensional ratios in the drawings are exaggerated for convenience of explanation, and are different from the actual ratios.

Overall Structure of the Battery

Figure 1:
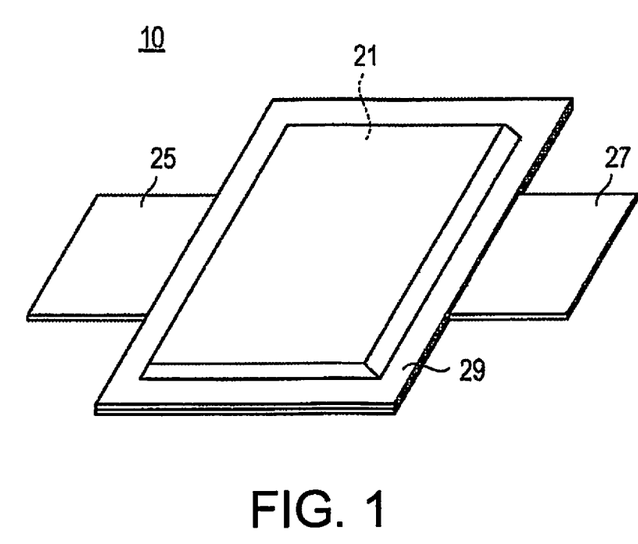
FIG. 1 is a schematic perspective view illustrating the appearance of a lithium ion secondary battery.

FIG. 1 is a perspective view representing the appearance of a flat lithium ion secondary battery as one example of a secondary battery that can be produced by the present embodiment.

The flat lithium ion secondary battery 10 has a flat rectangular shape, and a positive electrode tab 27 and a negative electrode tab 25 for drawing electrical power are pulled out from the two sides thereof, as illustrated in FIG. 1. The power generating element 21 of the lithium ion secondary battery 10 is clad in a battery cladding material 29. The periphery of the battery cladding material 29 is sealed by thermal fusion, in a state in which the positive electrode tab 27 and the negative electrode tab 25 are pulled out from the power generating element 21 to the outside of the battery cladding material 29. The power generating element 21 is obtained by layering multiple single cell layers (unit cells) 19 configured from a positive electrode active material layer 15, an electrolyte layer 17, and a negative electrode active material layer 13. Accordingly, a battery with such a form is also called a laminated battery.

The manner of pulling out the tabs illustrated in FIG. 1 is not particularly limited. The manner is not limited to the form illustrated in FIG. 1. For example, the positive electrode tab 25 and the negative electrode tab 27 may be drawn from the same side, or, the positive electrode tab 27 and the negative electrode tab 25 may each be divided into multiple sections and drawn from each side.

Figure 2:
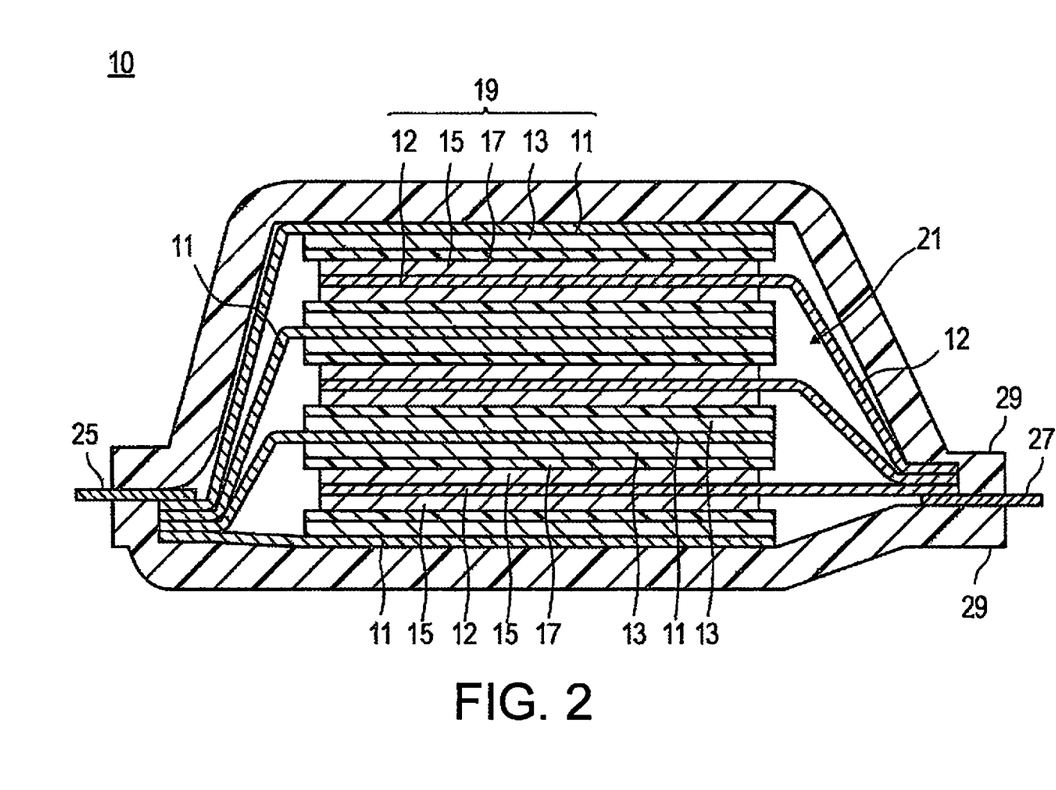
FIG. 2 is a schematic cross-sectional view illustrating the structure of a lithium ion secondary battery.

FIG. 2 is a schematic cross-sectional view illustrating the structure of the lithium ion secondary battery.

The laminated lithium ion secondary battery 10 of the present embodiment comprises a structure in which a substantially rectangular power generating element 21, in which a charge-discharge reaction progresses, is sealed inside a battery cladding material 29 comprising an outer package, as illustrated in FIG. 2. Here, the power generating element 21 comprises a structure in which a positive electrode active material layer 15, a separator 17, and a negative electrode active material layer 13 are layered. The separator 17 incorporates a non-aqueous electrolyte (for example, a liquid electrolyte). The positive electrode comprises a structure in which positive electrode active material layers 15 are disposed on both sides of a positive electrode current collector 12. The negative electrode comprises a structure in which negative electrode active material layers 13 are disposed on both sides of a negative electrode current collector 11. Specifically, one positive electrode active material layer 15 and a negative electrode active material layer 13 adjacent thereto are layered so as to face each other via a separator 17, in the order of the negative electrode (negative electrode current collector 11 and negative electrode active material layer 13), the electrolyte layer (non-aqueous electrolyte-containing separator 17), and the positive electrode (positive electrode current collector 12 and positive electrode active material layer 15). Thus, a contiguous negative electrode, electrolyte layer, and positive electrode configure one single cell layer 19. The lithium ion secondary battery 10 illustrated in FIG. 1 shows that six single cell layers 19 are layered. Of course, an actual battery is not limited to such a number of layers. Each single cell thereby comprises a structure formed by being electrically connected in parallel.

The positive electrode current collector 12 and the negative electrode current collector 11 comprise a structure in which a positive electrode collector plate (tab) 27 and a negative electrode collector plate (tab) 25 are respectively attached to each electrode (positive electrode and negative electrode), and led to the outside of the battery cladding material 29 being sandwiched by the ends of the battery cladding material 29. The positive electrode collector plate 27 and the negative electrode collector plate 25 may be respectively attached to the positive electrode current collector 12 and the negative electrode current collector 11 of each electrode via a positive electrode lead and a negative electrode lead (not shown), if necessary, by ultrasonic welding or resistance welding.

Positive Electrode Active Material Layer

The positive electrode active material layer comprises a positive electrode active material that is capable of occluding ions during discharge and releasing ions during charging. Specifically, the positive electrode active material layer of the present embodiment is required to comprise a solid solution positive electrode active material having $Li_2MnO_3$ as a parent structure. The specific form of such a solid solution positive electrode active material is not particularly limited, but the solid solution of lithium-containing transition metal oxide represented by the following composition formula (1) is particularly preferable.

$$Li_{(2-0.5x)}Mn_{1-x}M_{1.5x}O_3 \text{ ($x$ satisfies } 0<x<1) \tag{1}$$

In formula (1), M is $Ni_aCo_bMn_cM1_d$ (in which the ranges of a, b, c, and d satisfy $0<a\leq0.5$, $0\leq b\leq0.33$, $0<c\leq0.5$, and $0\leq d\leq0.1$, and the sum of a, b, c, and d becomes 1), which is a lithium-containing transition metal oxide in which the crystal structure is a layered system. In addition, M1 in "$Ni_aCo_bMn_cM1_d$" is an element selected from Li, V, Al, Zr, Ti, Nb, Fe, Cu, Cr, Mg, and Zn.

When used as a positive electrode active material of a lithium ion secondary battery, this type of a solid solution of lithium-containing transition metal oxide can achieve a high discharge capacity and capacity retention rate, and thus is favorably used in lithium ion secondary batteries and positive electrodes for lithium ion secondary batteries. As a result, the lithium ion secondary battery can be favorably used as a driving power source or an auxiliary power source of a vehicle. In addition, the material can be sufficiently applied to a lithium ion secondary battery for use in household or in portable devices.

In "$Ni_aCo_bMn_cM1_d$", if the ranges of a, b, c, and d satisfy $0<a\leq0.5$, $0\leq b\leq0.33$, $0<c\leq0.5$, and $0\leq d\leq0.1$, but the sum of a, b, c, and d does not become 1, the structure in the solid solution does not stabilize.

Additionally, the positive electrode active material layer may further comprise a positive electrode active material other than the predetermined solid solution positive electrode active material described above. Favorable examples of such positive electrode active material include complex oxides of lithium and transition metals, transition metal oxides, transition metal sulfides, $PbO_2$, $AgO$, and $NiOOH$, which may be used individually or as a mixture of two or more types thereof.

Examples of complex oxides of lithium and transition metals include, for example, as a well-known positive electrode active material, lithium-transition metal complex oxides, lithium-transition metal phosphate compounds, lithium-transition metal sulfate compounds, ternary systems, NiMn systems, NiCo systems, and spinel Mn systems.

Examples of lithium-transition metal complex oxides include $LiMn_2O_4$, $LiCoO_2$, $LiNiO_2$, $Li(Ni, Mn, Co)O_2$, $Li(Li, Ni, Mn, Co)O_2$, $LiFePO_4$, and those in which a portion of these transition metals is replaced by another element.

Examples of a ternary system include nickel-cobalt-manganese-based (composite) positive electrode materials, and the like. Examples of a spinel Mn system include $LiMn_2O_4$, and the like. Examples of a NiMn system include $LiNi_{0.5}Mn_{1.5}O_4$, and the like. Examples of a NiCo system include $Li(NiCo)O_2$, and the like. Multiple types of these positive electrode active materials can be used in combination as well.

The "composition ratio of $Li_2MnO_3$ in the solid solution" can be calculated from the composition formula of the solid solution lithium-containing transition metal oxide. The presence/absence of a layered structure portion and a spinel structure portion in the solid solution lithium-containing transition metal oxide can be determined from the presence of peaks specific to layered structures and spinel structures by X-ray diffraction analysis (XRD), and the ratio thereof can be determined from measurement/calculation of capacity as described above.

In addition, the positive electrode active material layer may comprise additives such as surface active surfactants, conductive assistants, binders, electrolytes (polymer matrix, ion-conduction polymers, electrolytic solutions), and lithium salts for enhancing ion conductivity, as optional components depending on the purpose therefor.

The binders, if hydrophobic, are not particularly limited, examples of which include the following materials.

Thermoplastic polymers such as polybutylene terephthalate, polyethylene terephthalate, polyvinylidene-fluoride (PVDF) (including compounds in which the hydrogen atom is substituted by another halogen element), polyethylene, polypropylene, polymethylpentene, polybutene, polyether nitrile, polytetrafluoroethylene, polyacrylonitrile, polyimide, polyamide, ethylene-vinyl acetate copolymer, polyvinyl chloride, styrene-butadiene rubber (SBR), ethylene-propylene-diene copolymer, styrene-butadiene-styrene block copolymer and its hydrogen additives, and styrene-isoprene-styrene block copolymer and its hydrogen additives; fluoride resins such as tetrafluoroethylene-hexafluoropropylene copolymer (FEP), tetrafluoroethylene-perfluoroalkyl vinylether copolymer (PFA), ethylene-tetrafluoroethylene copolymer (ETFE), polychlorotrifluoroethylene (PCTFE), ethylene-chlorotrifluoroethylene copolymer (ECTFE), and polyvinyl fluoride (PVF); vinylidenefluoride fluororubbers such as vinylidenefluoride-hexafluoropropylene fluororubber (VDF-HFP fluororubber), vinylidenefluoride-hexafluoropropylene-tetrafluoroethylene fluororubber (VDF-HFP-TFE fluororubber), vinylidenefluoride-pentafluoropropylene fluororubber (VDF-PFP fluororubber), vinylidenefluoride-pentafluoropropylene-tetraflouroethylene fluororubber (VDF-PFP-TFE fluororubber), vinylidenefluoride-perfluoromethyl vinylether-tetrafluorbethylene fluororubber (VDF-PFMVE-TFE fluororubber), and vinylidenefluoride-chlorotrifluoroethylene fluororubber (VDF-CTFE fluororubber); and epoxy resin, etc. Of these, polyimide, styrene-butadiene rubber, carboxymethylcellulose, polypropylene, polytetrafluoroethylene, polyacrylonitrile, and polyamide are more preferred.

These favorable binders have excellent heat resistance, extremely wide potential windows, stable in both positive electrode potential and negative electrode potential, and can be used in an active material layer. These binders may be used individually, or two or more types may be used in combination. In the production steps, these binders may be used as that which is dissolved in an organic solvent capable of dissolving the binder, such as N-methyl-2 pyrrolidone (NMP).

Examples of the above-described surface active surfactant that can be used include well-known cationic surfactants, anionic surfactants, and amphoteric surfactants.

The conductive assistant described above is an additive that is blended in order to improve the conductivity of the positive electrode active material layer or the negative electrode active material layer. Examples of conductive assistants include carbon black such as acetylene black, graphite, and carbon materials such as carbon fiber. If the electrode active material layer contains a conductive assistant, an electron network is effectively formed inside the electrode active material layer, which can contribute to an improvement in the output features of the battery.

An electrolyte salt (lithium salt) if preferable as the electrolyte, specific examples of which include $Li(C_2F_5SO_2)_2N$, $LiPF_6$, $LiBF_4$, $LiClO_4$, $LiAsF_6$, $LiCF_3SO_3$, and the like.

Examples of the ion-conducting polymer include polyethylene oxide (PEO) system and polypropylene oxide (PPO) system polymers.

In addition, in the present embodiment, the compounding ratio of the conductive assistants, electrolytes (polymer matrix, ion-conducting polymer, electrolytic solution, etc.), and other additives such as lithium salts for enhancing ion conductivity that can be contained in the positive electrode active material layer and the negative electrode active material layer is not particularly limited. The compounding ratio thereof can be adjusted by appropriately referring to well-known knowledge about nonaqueous solvent secondary batteries.

Here, the compounding ratio of the binders, conductive assistants, etc., included in the positive electrode active material layer preferably satisfies the following formula (2).

$$e(\text{solid solution}) + f(\text{binder}) + g(\text{conductive assistant}) \quad (2)$$

In the formula, e, f, and g represent the weight % in the positive electrode active material layer and satisfy $e+f+g=100$, $80 \leq e \leq 98$, $1 \leq f \leq 10$, and $1 \leq g \leq 10$. By employing such a compounding ratio, the effects of the activation treatment can be exerted and battery degradation suppressed.

Negative Electrode Active Material Layer

In the present embodiment, carbon materials or silicon (Si) based materials may be used as the negative electrode active material layer.

Examples of negative electrode active material include carbon materials, silicon-based materials, and tin-based materials. In some cases, two or more types of negative electrode active materials may be used in combination. Preferably, from the point of view of capacity and output features, carbon materials such as graphite, soft carbon, and hard carbon are used as the negative electrode active material. It is needless to say that negative electrode active materials other that the above may be used as well.

The negative electrode active material layer comprises the predetermined active materials described above, and may comprise additives such as surface active surfactants, conductive assistants, binders, electrolytes (polymer matrix, ion-conduction polymers, electrolytic solutions), and lithium salts for enhancing ion conductivity, as optional components depending on the purpose therefor. Additives such as surface active surfactants, conductive assistants, binders, electrolytes (polymer matrix, ion-conduction polymers, electrolytic solutions), and lithium salts for enhancing ion conductivity are the same as those described in the positive electrode active material layer section above.

In particular, the negative electrode active material layer preferably comprises the structure represented by the following formula (3).

$$\alpha(\text{silicon-based material}) + \beta(\text{carbon material}) + \gamma(\text{binder}) + \eta(\text{conductive assistant}) \quad (3)$$

Here, $\alpha$, $\beta$, $\gamma$, and $\eta$ represent the weight % in the negative electrode active material layer, satisfy $\alpha+\beta+\gamma+\eta=100$, $80 \leq \alpha+\beta \leq 98$, $3 \leq \alpha \leq 40$, $40 \leq \beta \leq 95$, $1 \leq \gamma \leq 10$, $1 \leq \eta \leq 10$, and the silicon-based material is a material having silicon as the main element.

The silicon-based material having silicon as the main constituent element is $SiO_x$ (x is a number of oxygen atoms that satisfies the valence of Si, and is in the range of $0.5 \leq x \leq 1.5$), or at least one type selected from a group consisting of $Si_xTi_yGe_zA_a$, $Si_xTi_yZn_zA_a$, $Si_xTi_ySn_zA_a$, $Si_xSn_yAl_zA_a$, $Si_xSn_yV_zA_a$, $Si_xSn_yC_zA_a$, $Si_xZn_yV_zA_a$, $Si_xZn_ySn_zA_a$, $Si_xZn_yAl_zA_a$, $Si_xZn_yC_zA_a$, $Si_xAl_yC_zA_a$, $Si_xAl_yNb_zA_a$ (in the formulas, A represent inevitable impurities. Further, x, y, z, and a represent values of weight %, satisfy $0<x<100$, $0<y<100$, $0<z<100$, $0 \leq a<0.5$, and $x+y+z+a=100$).

The average particle diameter of the negative electrode active material is not particularly limited, but, from the point of view of high-output, is preferably 1-100 μm, and more preferably 1-20 μm.

Electrolyte Layer

The electrolyte layer in the present embodiment is obtained by a separator being impregnated in electrolytic solution. The separator according to the present embodiment, wherein the ionic conductivity when infiltrated with electrolytic solution is a set ratio or greater with respect to the ionic conductivity of the electrolytic solution alone, and/or that the opening ratio (the proportion of pores per unit area) is a set ratio or greater.

Separator

The separator functions to hold the electrolyte and secure lithium ion conductivity between the positive electrode and the negative electrode, and as a partition between the positive electrode and the negative electrode.

Examples of forms of the separator include porous sheet separators made of polymers or fibers that absorb and hold the electrolyte and nonwoven fabric separators.

In the present embodiment, the ion conductivity when the separator is infiltrated with electrolytic solution is 20% or more of the ion conductivity of the electrolytic solution alone, preferably 40% or more, and more preferably 45% or more. If the ion conductivity when the separator is infiltrated with electrolytic solution is 20% or more of the ion conductivity of the electrolytic solution alone, the durability can be improved.

In the present embodiment, the opening ratio of the separator is 50% or more, preferably 60% or more, and more preferably 70% or more. If the opening ratio of the separator is 50% or more, clogging due to decomposition products can be sufficiently suppressed. In addition, the opening ratio of the separator is preferably 75% or less, from the point of view of the strength of the separator.

Examples of materials that configure these separators, whether a microporous separator or a nonwoven fabric separator, preferably have affinity with organic electrolytic solutions and can swell with respect to the organic electrolytic solution. These materials are not particularly limited, examples of which include materials having cellulose, polyethylene glycol, or PVDF-HFP as the main framework. The pores will spread due to swelling caused by the electrolytic solution, and it becomes possible to suppress clogging due to decomposition products without compromising the ion conductivity. In addition, the average pore size of a separator having such materials capable of swelling as the main framework is preferably 0.5 μm or greater. With such a pore size, the holes are not easily clogged by decomposition products and the movement of ions is barely inhibited, which allows improvement in the cycle features.

Examples of other materials that can be used for the separator include microporous materials (microporous film), in the case of a porous sheet separator made of polymers or fiber. Examples of specific forms of porous sheets made of polymers or fiber include microporous (microporous film) separators made of polyolefins such as polyethylene (PE) and polypropylene (PP), laminated bodies obtained by layering multiple layers of (for example, a laminated body with a three-layer structure of PP/PE/PP), polyimide, aramid, hydrocarbon resins such as polyvinylidene fluoride-hexafluoropropylene (PVdF-HFP), and glass fiber.

The thickness of the microporous (microporous film) separator differs depending on the intended use, and thus cannot be unambiguously defined. As one example, when used in a secondary battery for driving the motor in an electric vehicle (EV), a hybrid electric vehicle (HEV), or a fuel cell vehicle (FCV), the thickness of a single-layer or multi-layer separator is preferably 4-60 μm.

Examples of materials used in a nonwoven fabric separator include cotton, rayon, acetate, polyamide (for example nylon (registered trademark)), polyester, polyolefins such as PP, PE, polymide and aramid, which may be used individually or as a mixture thereof.

In addition, the bulk density of the nonwoven fabric is not particularly limited, as long as sufficient battery features can be obtained by the polymer gel electrolyte used for impregnation. Furthermore, the thickness of the nonwoven fabric separator need only be the same as the electrolyte layer, preferably 5-200 μm and particularly preferably 10-100 μm.

In the present embodiment, the ion conductivity when the separator is infiltrated with electrolytic solution is 20% or more of the ion conductivity of the electrolytic solution alone, preferably 25% or more, and more preferably 40% or more. If the ion conductivity when the separator is infiltrated with electrolytic solution is 20% or less with respect to the ion conductivity of the electrolytic solution alone, it is not preferable from the point of view of reduced cycle features.

Electrolytes

The electrolytes used to infiltrate the separator are not particularly limited, and a liquid electrolyte or a gel polymer electrolyte can be used. By using a gel polymer electrolyte, the distance between the electrodes is stabilized, generation of polarization is suppressed, and durability (cycle features) is improved.

A liquid electrolyte functions as a carrier of lithium ions. A liquid electrolyte comprising the electrolyte layer has a form in which lithium salt, which is a supporting salt, is dissolved in an organic solvent, which is a plasticizer. Examples of organic solvents that are used include carbonates such as ethylene carbonates (EC), propylene carbonates (PC), dimethyl carbonate (DMC), diethyl carbonates (DEC), and ethyl methyl carbonates, two or more types of which may be used as a mixture. In addition, compounds that can be added to the active material layer of electrodes such as $Li(CF_3SO_2)_2N$, $Li(C_2F_5SO_2)_2N$, $LiPF_6$, $LiBF_4$, $LiClO_4$, $LiAsF_6$, and $LiTaF_6$, $LiCF_3SO_3$ may be employed as the lithium salt as well. The liquid electrolyte may further comprise additives other than the components described above. Specific examples of such compounds include vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1, 2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyloxymethyl ethylene carbonate, allyloxymethyl ethylene carbonate, acryloxy methyl ethylene carbonate, methacryloxymethyl ethylene carbonate, ethinyl ethylene carbonate, propargyl ethylene carbonate, ethynyloxy methyl ethylene carbonate, propargyloxy ethylene carbonate, methylene ethylene carbonate, and 1,1-dimethyl-2-methylene ethylene carbonate. Of the above, vinylene carbonate, methyl vinylene carbonate, and vinyl ethylene carbonate are preferable, and vinylene carbonate and vinyl ethylene carbonate are more preferable. One type of these cyclic carbonic acid esters may be used individually, or two or more types may be used in combination.

The gel polymer electrolyte has a structure in which the liquid electrolyte described above is injected into a matrix polymer (host polymer) comprising an ion-conducting polymer. The fluidity of the electrolyte is eliminated by using a gel polymer electrolyte as the electrolyte, which is superior in that blocking of the ion conductivity between each layer is facilitated. Examples of ion-conducting polymers used as the matrix polymer (host polymer) include polyethylene oxide (PEO), polypropylene oxide (PPO), polyethylene glycol (PEG), polyacrylonitrile (PAN), polyvinylidene fluoride-co-hexafluoropropene (PVdF-HFP), poly methyl methacrylate (PMMA), and copolymers thereof.

The matrix polymer of a gel electrolyte can exhibit excellent mechanical strength by forming a cross-linked structure. In order to form a cross-linking structure, a polymerization treatment, such as thermal polymerization, ultraviolet polymerization, radiation polymerization, and electron beam polymerization, may be carried out with respect to a polymerizable polymer for forming polyelectrolytes (e.g., PEO and PPO), using an appropriate polymerization initiator.

Current Collector

While materials that constitute the current collector are not particularly limited, metal is preferably used.

Specific examples of metals include aluminum, nickel, iron, stainless steel, titanium, copper, and other alloys. In addition to the above, a clad material of nickel and aluminum, a clad material of copper and aluminum, or a plating material of a combination of these metals may be preferably used. Additionally, the metal may be a foil obtained by aluminum being applied to the surface thereof. Of the above, from the point of view of electron conductivity and battery operating potential, aluminum, stainless steel, and copper are favorable.

The size of the current collector is determined according to the intended use of the battery. For example, if being used for a large battery, which is required to have a high energy density, a current collector with a large area is used. The thickness of the current collector is not particularly limited. The thickness of the current collector is normally about 1-100 μm.

Positive Electrode Collector Plate and Negative Electrode Collector Plate

The material of the current collector plates (25, 27) is not particularly limited. Well-known highly conductive materials which are conventionally used as current collector plates in a lithium ion secondary battery may be used. Preferable examples of constituent materials of the current collector plate include metal materials such as aluminum, copper, titanium, nickel, stainless steel (SUS), and alloys thereof. From the point of view of being lightweight, corrosion-resistant, and having high conductivity, aluminum and copper are preferable, and aluminum is particularly preferable. Meanwhile, the same material may be used for the positive electrode collector plate 25 and the negative electrode collector plate 27, or different materials may be used therefor.

Positive Electrode Lead and Negative Electrode Lead

Additionally, while not shown, the current collector and the current collector plate may be electrically connected via a positive electrode lead and a negative electrode lead. Well-known materials that are used in lithium ion secondary batteries may be similarly employed as constituent materials of the positive electrode and negative electrode leads. The portion that is removed from the cladding is preferably covered by a heat shrinkable tube with heat insulating properties so as to not affect the product (e.g., automobile parts, especially electronic equipment, etc.) by coming in contact with a peripheral device or wiring and causing electrical leakage.

Battery Outer Package

For the battery outer package 29, a well-known metal can case may be used, or a bag-shaped case using a laminate film containing aluminum may be used, which is capable of covering the power generating element. A laminate film with a three-layer structure obtained by layering, for example, PP, aluminum, and nylon, in that order, may be used for the laminate film, but there are no limitations. Laminate film is preferable from the point of view of having high output and excellent cooling performance, and for the advantageous applicability thereof to batteries for large equipment such as EVs and HEVs. Aluminate laminate is more preferable for the outer package, with which it is possible to easily adjust the group pressure applied from the outside to the power generating element, and to easily adjust to the desired layer thickness of the electrolytic solution.

Activation Method

The secondary battery of the present embodiment uses the solid solution positive electrode active material as described above, which requires high-voltage charging, in order to manifest a high capacity. As a negative electrode in relation to such a positive electrode, as already described, currently used carbon materials, silicon-based materials with which high capacity can be expected, or a negative electrode active material obtained by a combination of both may be used. Of the above, the negative electrode preferably contains a negative electrode active material configured from the composition shown in formula (3) above.

Here, in the solid solution positive electrode active material described above, change in the crystal structure occurs as lithium ions are being released from the positive electrode active material particles during the initial charging step. The reasons are presumed to be as follows. In the charging step, if discharge is carried out after all the mobile lithium ions contained in the solid solution positive electrode active material have been released, then the mobile lithium ions will return to the solid solution positive electrode active material. At this time, the crystal structure will have changed greatly compared to that prior to charging, and the stress that accompanies crystal structure changes can no longer be completely relaxed. Then, cracks on the surfaces of the active material particles as well as decrystallization of the structure will progress. It is thought that, as a result, deterioration occurs in the subsequent charge-discharge cycles.

In order to prevent the occurrence of such significant crystal structure changes, it is considered good practice to carry out a battery activation step that increases the charging voltage in a stepwise manner. Lithium ions are taken in and out of the positive electrode active material (charged/discharged) while increasing the movement amount of lithium ions by this battery activation step. It is possible to create some leeway in time for relaxing the stress that accompanies crystal structure changes by such a battery activation step. In addition, it is possible to promote the arrangement of lithium atoms at prescribed sites in the crystal structure of the positive electrode active material by this battery activation step. Accordingly, it becomes possible to stabilize the surface structure of the positive electrode active material by carrying out the battery activation step.

However, resistance increases in the solid solution positive electrode active material in the terminal phase of charge-discharge, generating a large overvoltage. Consequently, lithium ions that cannot return to the positive electrode active material (i.e., those that cannot be discharged) occur in the terminal phase of discharge, due to a misalignment between the cell voltage and the positive electrode potential that occurs due to overvoltage. This type of lithium ions become the residual capacity of the negative electrode. In order for there to be sufficient crystal structure change of the solid solution positive electrode active material and to achieve stabilization, it is necessary to suppress such a negative electrode residual capacity, and to arrange the lithium atoms at prescribed sites in the crystal structure of the positive electrode active material.

From these points of view, in a carbon material, it is important to improve the SEI (Solid Electrolyte Interface) which is formed by the electrolytic solution being decomposed on the active material surface in the initial charging step. For this purpose, it is necessary to hold the charging state in a relatively low SOC region. It is thereby possible to form SEI on the carbon material surface.

In addition, in a silicon-based material, in exchange for exhibiting a high capacity, there is significant volume expansion in the charge-discharge step compared with a carbon material. Accordingly, the SEI forming steps that accompanies electrolyte decomposition on the active material surface needs to be changed from that for a carbon material such as graphite. Specifically, by holding a state in which the silicon-based material is swollen by charging, it becomes possible to form the SEI while maintaining a state in which the surface area of the silicon-based material is at a maximum in each step. Therefore, it is important to suppress continuous electrolyte decomposition due to carrying out charge-discharge while SEI formation is insufficient.

From this point of view, the present inventors have found an activation method that suppresses deterioration caused by repeating charge-discharge, and with which it is possible to form the SEI on the carbon material surface while suppressing continuous electrolyte decomposition, in order to prolong battery life. This activation method will be described below.

Here, activation is an initial charge-discharge step that is carried out after producing a battery type. As is well known, the production of a battery comprises a step to shape the battery by sealing a positive electrode, a separator, a negative electrode, and electrolyte, etc., in an outer package described above. However, the above only achieves forming a battery in a particular shape, and sufficient performance as a secondary battery cannot yet be obtained. Accordingly, charge-discharge is carried out as a means of activating the battery that has been created. The battery production steps are completed by carrying out this activation.

Figure 3A:
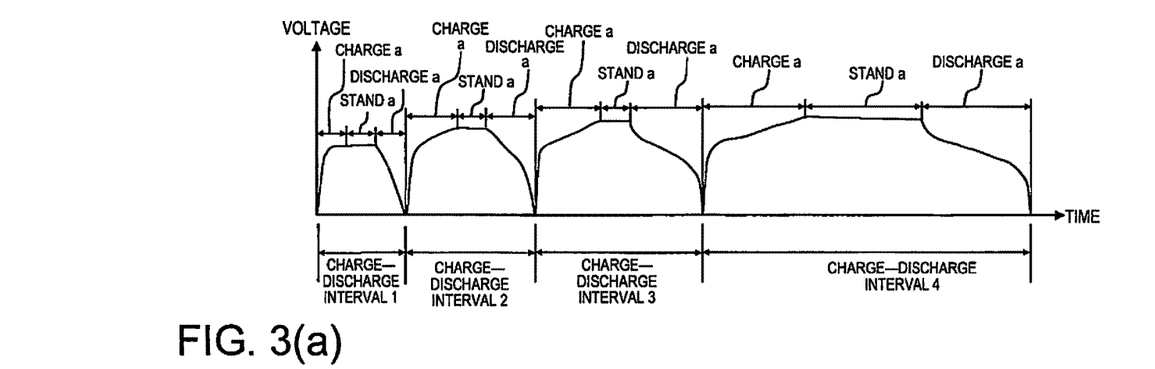
FIG. 3(a) is a graph for explaining the first activation method.
Figure 3B:
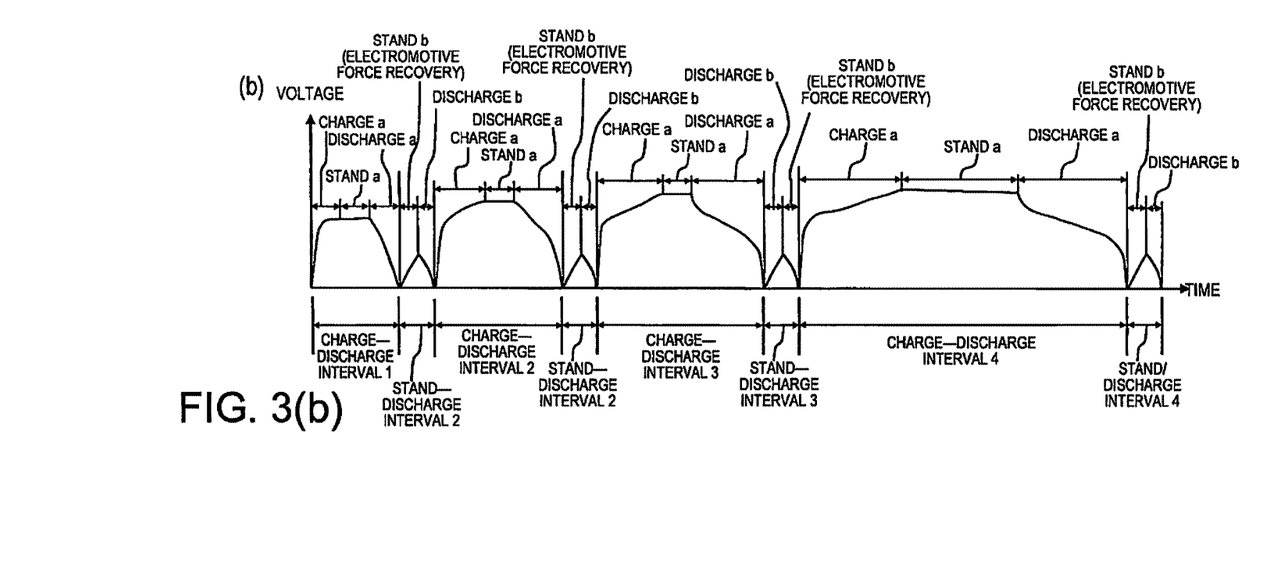
FIG. 3(b) is a graph for explaining the second activation method.

FIG. 3 is a graph for explaining the activation methods in the present embodiment, where (a) illustrates the first activation method (activation method according to a first production method) and (b) illustrates the second activation method (activation method according to a second activation method). In all of the graphs, the horizontal axis is time and the vertical axis is voltage.

As shown, multiple charge-discharge intervals are provided in the present embodiment as a means of activation.

The charge-discharge interval is the same for the first activation method and the second activation method, and is set so that the upper limit charging voltage is the same as or higher than the immediately prior charge-discharge interval. That is, as illustrated, the upper limit charging voltage is set so as to be charge-discharge interval 1≤charge-discharge interval 2≤charge-discharge interval 3. Preferably, the upper limit charging voltage is set so that the upper limit charging voltage will be higher than during the previous charging in at least one of the intervals. Each charge-discharge interval comprises charge a, idle a, and discharge a.

In the first activation method, discharge is carried out at a lower current density than the current density during charging (the charge a portion), during each discharge (discharge a portion) multiple charges-discharges (charge-discharge intervals 1-4), as illustrated in FIG. 3(a).

In the second activation method, idle/discharge intervals 1-4 are provided immediately after each multiple charges-discharges (charge-discharge intervals 1-4), as illustrated in FIG. 3(b). The idle/discharge interval comprises idle b and discharge b. In idle b, the electromotive force is naturally recovered. In the subsequent discharge b, the electricity that is stored by the natural recovery is discharged. This discharge b carries out discharge at a lower current density than the current density during charging (charge a portion) in the immediately prior charge-discharge interval. The current density of discharge a in the charge-discharge interval in this second activation method is not particularly limited. The natural recovery of the electromotive force is achieved by standing idle for a predetermined time set in advance without applying a load (without carrying out charge-discharge) during idle b. This idle time is also not particularly limited, however, if too short, there is little natural recovery of the electromotive force. Conversely, the electromotive force by natural recovery does not increase by simply standing idle for a long time. Accordingly, for example, 1-2 hours of standing idle is sufficient.

Basically, control of the current density may be carried out by constant current charging and constant current discharge. However, the current density may be changed in the interim. The current density during charging may be referred to as charging rate, and the current density during discharge may be referred to as discharge rate.

With such an activation treatment, it is possible to make the theoretical capacity of the battery (represented by theoretical capacity=positive electrode discharge capacity-negative electrode irreversible capacity+positive electrode irreversible capacity) 95% or more. Accordingly, the movement amount of lithium ions in the activation step is sufficient, and it is possible to stabilize the positive electrode crystal structure. Therefore, when the battery is actually used as a secondary battery, it becomes possible to suppress the degradation caused by repeated charge-discharge and to prolong battery life.

Figure 4:
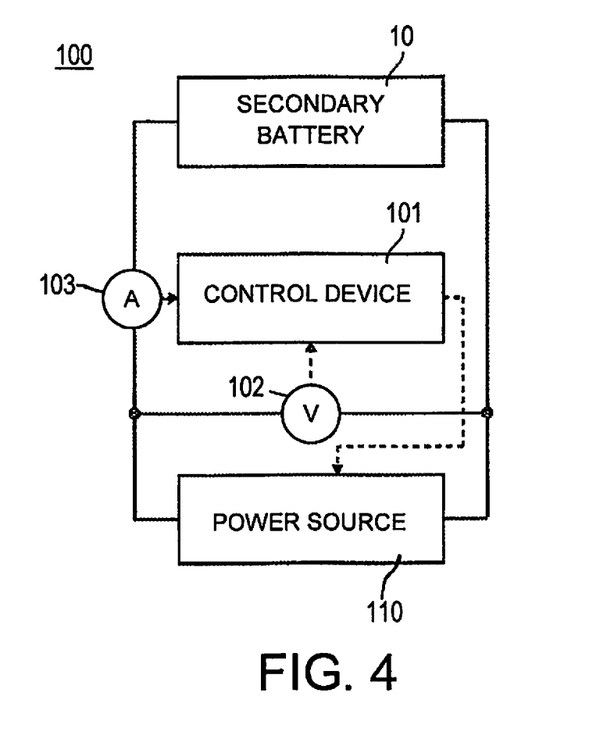
FIG. 4 is a block diagram for explaining the charge-discharge device.

FIG. 4 is a block diagram explaining one example of a charge-discharge device that carries out charge-discharge control for such an activation treatment.

The charge-discharge device 100 comprises a control device 101, a voltmeter 102, and an ammeter 103. The control device 101 monitors the voltmeter 102 and the ammeter 103, and controls the voltage and the current from the power source 110 to the secondary battery 10 so that the charge-discharge voltage and the charging rate will become those described as the activation method. In addition, the control device applies load (or removes load) during discharge so that the discharge rate will be that described as the activation method.

EXAMPLES

Examples that use the present embodiment will be described. Cases in which the present embodiment is not applied are described as comparative examples.

Production of Sample Batteries

1. Creating the Negative Electrode

Graphite powder as the negative electrode active material, acetylene black as the conductive assistant, and PVDF as the binder were mixed so that the weight ratio thereof was 90:5:5 respectively. Next, N-methylpyrrolidone was added thereto as a solvent and mixed to create a negative electrode slurry. Copper foil was used as the current collector, on which the negative electrode slurry obtained above was applied and then sufficiently dried. Then, after drying for 24 hours under vacuum, a negative electrode was obtained.

2. Creating the Positive Electrode $Li_{1.85}Ni_{0.18}Co_{0.10}Mn_{0.87}O_3$ (which is formula (1) in which x=0.3, a=0.40, b=0.22, c=0.38, and d=0) as the positive electrode active material, acetylene black as the conductive assistant, and PVDF as the binder were mixed so that the weight ratio was 90:5:5. Next, N-methylpyrrolidone was added thereto as a solvent and mixed to create a positive electrode slurry. Aluminum foil was used as the current collector, on which the positive electrode slurry obtained above was applied and then sufficiently dried. Then, after drying for 24 hours under vacuum, a positive electrode was obtained.

3. Preparation of the Battery

The negative electrode and the positive electrode prepared above were opposed, between which was disposed a polyolefin separator with a thickness of 20 μm. The laminated body of this negative electrode, separator, and positive electrode was disposed in an aluminum laminate cell. Next, 1M $LiPF_6$ EC+DEC (1:2) was injected into the cell as the electrolytic solution and sealed to obtain a lithium ion secondary battery.

4. Activation Treatment

Comparative Example 1

In comparative example 1, the lithium ion secondary battery prepared above was charged to 4.75V by the constant current method (equivalent to current density: 0.1 C) under a 30° C. atmosphere, paused for 10 minutes, then discharged to 2V by the constant current method (equivalent to current density: 0.1 C).

Comparative Example 2

In comparative example 2, the following charge-discharge step was carried out with respect to the lithium ion secondary battery prepared above.

(Step 1) The battery was charged to 4.45V by the constant current method (equivalent to current density: 0.1 C) under a 30° C. atmosphere, paused for 10 minutes, then discharged to 2V by the constant current method (equivalent to current density: 0.1 C). This cycle was repeated twice.

(Step 2) Next, the battery was charged to 4.55V by the constant current method (equivalent to current density: 0.1 C), paused for 10 minutes, then discharged to 2V by the constant current method (equivalent to current density: 0.1 C).

(Step 3) Next, the battery was charged to 4.65V by the constant current method (equivalent to current density: 0.1 C), paused for 10 minutes, then discharged to 2V by the constant current method (equivalent to current density: 0.1 C).

(Step 4) Finally, the battery was charged to 4.75V by the constant current method (equivalent to current density: 0.1 C), paused for 10 minutes, then discharged to 2V by the constant current method (equivalent to current density: 0.1 C).

Example 1

In Example 1, the lithium ion secondary battery prepared above was activated by the first activation method according to the following charge-discharge steps.

(Step 1) The battery was charged to 4.45V by the constant current method (equivalent to current density: 0.1 C) under a 30° C. atmosphere, paused for 10 minutes, then discharged to 2V by the constant current method (equivalent to current density: 0.02 C). This cycle was repeated twice.

(Step 2) Next, the battery was charged to 4.55V by the constant current method (equivalent to current density: 0.1 C), paused for 10 minutes, then discharged to 2V by the constant current method (equivalent to current density: 0.02 C).

(Step 3) Next, the battery was charged to 4.65V by the constant current method (equivalent to current density: 0.1

C), paused for 10 minutes, then discharged to 2V by the constant current method (equivalent to current density: 0.02 C).

(Step 4) Finally, the battery was charged to 4.75V by the constant current method (equivalent to current density: 0.1 C), paused for 10 minutes, then discharged to 2V by the constant current method (equivalent to current density: 0.02 C).

Example 2

In Example 2, the lithium ion secondary battery prepared above was activated by the second activation method according to the following charge-discharge steps.

(Step 1) The battery was charged to 4.45V by the constant current method (equivalent to current density: 0.1 C) under a 30° C. atmosphere, paused for 10 minutes, then discharged to 2V by the constant current method (equivalent to current density: 0.1 C). The battery was allowed to stand idle for one hour thereafter, then discharged to 2V by the constant current method (equivalent to current density: 0.01 C). This cycle was repeated twice.

(Step 2) Next, the battery was charged to 4.55V by the constant current method (equivalent to current density: 0.1 C), paused for 10 minutes, then discharged to 2V by the constant current method (equivalent to current density: 0.1 C). After one hour of pause, the battery was discharged to 2V by the constant current method (equivalent to current density: 0.01 C).

(Step 3) Next, the battery was charged to 4.65V by the constant current method (equivalent to current density: 0.1 C), paused for 10 minutes, then discharged to 2V by the constant current method (equivalent to current density: 0.1 C). After one hour of pause, the battery was discharged to 2V by the constant current method (equivalent to current density: 0.01 C).

(Step 4) Finally, the battery was charged to 4.75V by the constant current method (equivalent to current density: 0.1 C), paused for 10 minutes, then discharged to 2V by the constant current method (equivalent to current density: 0.1 C). After one hour of pause, the battery was discharged to 2V by the constant current method (equivalent to current density: 0.01 C).

Example 3

In Example 3, the lithium ion secondary battery prepared above was activated by the first activation method according to the following charge-discharge steps.

(Step 1) The battery was charged to 4.45V by the constant current method (equivalent to current density: 0.1 C) under a 30° C. atmosphere, paused for 10 minutes, then discharged to 3.4V by the constant current method (equivalent to current density: 0.1 C). Then, the battery was further discharged to 2V by the constant current method (equivalent to current density: 0.01 C). This cycle was repeated twice.

(Step 2) Next, the battery was charged to 4.55V by the constant current method (equivalent to current density: 0.1 C), paused for 10 minutes, then discharged to 3.4V by the constant current method (equivalent to current density: 0.1 C). Then, the battery was further discharged to 2V by the constant current method (equivalent to current density: 0.01 C).

(Step 3) Next, the battery was charged to 4.65V by the constant current method (equivalent to current density: 0.1 C), paused for 10 minutes, then discharged to 3.4V by the constant current method (equivalent to current density: 0.1 C). Then, the battery was further discharged to 2V by the constant current method (equivalent to current density: 0.01 C).

(Step 4) Finally, the battery was charged to 4.75V by the constant current method (equivalent to current density: 0.1 C), paused for 10 minutes, then discharged to 3.4V by the constant current method (equivalent to current density: 0.1 C). Then, the battery was further discharged to 2V by the constant current method (equivalent to current density: 0.01 C).

Example 4

In Example 4, the lithium ion secondary battery prepared above was activated by the second activation method according to the following charge-discharge steps for only Step 1, then activated by the first activation method for the subsequent Steps 2-4.

(Step 1) The battery was charged to 4.45V by the constant current method (equivalent to current density: 0.1 C) under a 30° C. atmosphere, paused for 10 minutes, then discharged to 2.7V by the constant current method (equivalent to current density: 0.1 C). After one hour of pause, the battery was discharged to 2V by the constant current method (equivalent to current density: 0.01 C). This cycle was repeated twice.

(Step 2) Next, the battery was charged to 4.55V by the constant current method (equivalent to current density: 0.1 C), paused for 10 minutes, then discharged to 2.7V by the constant current method (equivalent to current density: 0.1 C). Then, the battery was further discharged to 2V by the constant current method (equivalent to current density: 0.01 C).

(Step 3) Next, the battery was charged to 4.65V by the constant current method (equivalent to current density: 0.1 C), paused for 10 minutes, then discharged to 2.7V by the constant current method (equivalent to current density: 0.1 C). Then, the battery was further discharged to 2V by the constant current method (equivalent to current density: 0.01 C).

(Step 4) Finally, the battery was charged to 4.75V by the constant current method (equivalent to current density: 0.1 C), paused for 10 minutes, then discharged to 2.7V by the constant current method (equivalent to current density: 0.1 C). Then, the battery was further discharged to 2V by the constant current method (equivalent to current density: 0.01 C).

The conditions for charge, discharge, and idle of the comparative example and the examples are shown together in Table 1.

TABLE 1

| | Conditions of charge (current density C-attained voltage V), discharge (current density C-attained voltage V), and stand (idle time hr) |
|---|---|
| Comparative Example 1 | Charge: 0.1 C-4.75 V, discharge: 0.1 C-2 V |
| Comparative Example 2 | (Step 1) charge: 0.1 C-4.45 V, discharge: 0.1 C-2 V (Step 1 is repeated twice) (Step 2) charge: 0.1 C-4.55 V, discharge: 0.1 C-2 V (Step 3) charge: 0.1 C-4.65 V, discharge: 0.1 C-2 V (Step 4) charge: 0.1 C-4.75 V, discharge: 0.1 C-2 V |
| Example 1 (first activation method) | (Step 1) charge: 0.1 C-4.45 V, discharge: 0.02 C-2 V (Step 1 is repeated twice) (Step 2) charge: 0.1 C-4.55 V, discharge: 0.02 C-2 V (Step 3) charge: 0.1 C-4.65 V, discharge: 0.02 C-2 V (Step 4) charge: 0.1 C-4.75 V, discharge: 0.02 C-2V |

TABLE 1-continued

Conditions of charge (current density C-attained voltage V), discharge (current density C-attained voltage V), and stand (idle time hr)

| | |
|---|---|
| Example 2 (second activation method) | (Step 1) charge: 0.1 C-4.45 V, discharge: 0.1 C-2 V, idle: 1 hr, discharge: 0.01 C-2 V (Step 1 is repeated twice) <br> (Step 2) charge: 0.1 C-4.55 V, discharge: 0.1 C-2 V, idle: 1 hr, discharge: 0.01 C-2 V <br> (Step 3) charge: 0.1 C-4.65 V, discharge: 0.1 C-2 V, idle: 1 hr, discharge: 0.01 C-2 V <br> (Step 4) charge: 0.1 C-4.75 V, discharge: 0.1 C-2 V, idle: 1 hr, discharge: 0.0 C-2 V |
| Example 3 (first activation method) | (Step 1) charge: 0.1 C-4.45 V, discharge: 0.1 C-3.4 V, 0.01 C-2 V (Step 1 is repeated twice) <br> (Step 2) charge: 0.1 C-4.55 V, discharge: 0.1 C-3.4 V, 0.01 C-2 V <br> (Step 3) charge: 0.1 C-4.65 V, discharge: 0.1 C-3.4 V, 0.01 C-2 V <br> (Step 4) charge: 0.1 C-4.75 V, discharge: 0.1 C-3.4 V, 0.01 C-2 V |
| Example 4 (second + first activation methods) | (Step 1) charge: 0.1 C-4.45 V, discharge: 0.1 C-2.7 V, idle: 1 hr, discharge: 0.01 C-2 V (Step 1 is repeated twice) <br> (Step 2) charge: 0.1 C-4.55 V, discharge: 0.1 C-2.7 V, idle discharge: 0.01 C- 2 V <br> (Step 3) charge: 0.1 C-4.65 V, discharge: 0.1 C-2.7 V, idle discharge: 0.01 C-2 V <br> (Step 4) charge: 0.1C-4.75 V, discharge: 0.1 C-2.7 V, idle discharge: 0.01 C-2 V |

5. Cycle Features Evaluation

The lithium ion secondary batteries of the comparative examples and the examples, which were activation-treated as described above, were subjected to a charge-discharge cycle test to investigate the discharge capacity retention rate. That is, charging was carried out under a 30° C. atmosphere at a current density equivalent of 1 C and at an upper limit charging voltage of 4.45V by the constant current constant voltage method, paused for one minute, then discharged to 2V by the constant current discharge method at a current density equivalent of 1 C. This charge-discharge cycle was repeated 100 times. The evaluation results are shown in Table 2.

TABLE 2

| | Total time of activation step | Theoretical capacity of cell | Cell capacity | Retention rate after 100 cycles of 1 C charge-discharge |
|---|---|---|---|---|
| Comparative Example 1 | 20 hr | 245 mAh/g | 225 mAh/g | 30% |
| Comparative Example 2 | 80 hr | | 225 mAh/g | 50% |
| Example 1 | 400 hr | | 244 mAh/g | 92% |
| Example 2 | 85 hr | | 243 mAh/g | 91% |
| Example 3 | 205 hr | | 234 mAh/g | 83% |
| Example 4 | 90 hr | | 240 mAh/g | 91% |

Table 2 shows the total time required for battery activation, the cell capacity shown in terms of per positive electrode active material weight, and the capacity retention rate after carrying out 100 cycles of a charge-discharge test at 1 C, for each lithium ion secondary battery that was activated by the battery activation method shown in comparative examples 1, 2, and examples 1-4.

Looking at comparative examples 1 and 2, comparative example 2 which was treated to increase the upper limit charging voltage in a stepwise manner, when compared to comparative example 1 which was not treated in that way, had an equivalent cell capacity and a higher retention rate after 100 cycles.

Looking at example 1 and comparative example 2, the current density of example 1 was set to ⅕ of comparative example 2 in the discharge step of the activation step. While the time required for the activation step was longer for example 1, the cell capacity and the retention rate after 100 cycles were higher compared to comparative example 2.

Looking at example 1 and comparative example 3, in example 1, the current density of the discharge step of each step was set constant and discharge was carried out once. In example 3, the current density of the discharge step of each step was changed and carried out twice. Better results were obtained in example 1 regarding the cell capacity and the retention rate after 100 cycles compared to example 3.

Looking at example 2 and comparative example 2, in example 2, the number of times of discharge in each step was set to twice, and the current density in the second discharge step was set to ¹⁄₁₀ of comparative example 2, in the discharge step of the activation step. While the time required for the activation step was slightly longer for example 2, the cell capacity and the retention rate after 100 cycles both showed preferable results compared to comparative example 2.

Looking at example 3 and example 2, in example 3, the number of times of discharge in each step was set to twice, in the same way as example 2, but the first lower limit voltage was set higher than in example 2, in the discharge step of the activation step. In the same was as example 2, favorable results were obtained in example 3 regarding the cell capacity and the retention rate after 100 cycles.

In example 4, the number of times of discharge in each step was set to twice, and the first lower limit voltage was set higher compared to example 2 and lower compared to example 3, in the discharge step of the activation step. Example 4 exhibited favorable results regarding both the cell capacity and the retention rate after 100 cycles.

Embodiments and examples were described above, and the number of times of charge-discharge may be about at least twice, in order to increase the movement amount of lithium ions in relation to the theoretical capacity of the battery, thus allowing the stabilization of the positive electrode crystal structure.

According to the embodiment and examples described above, the following effects are exerted.

(1) According to the present embodiment, an activation treatment is carried out in a lithium ion secondary battery using a lithium-containing transition metal oxide represented by formula (1) as a solid solution positive electrode active material. In the first activation method (refer to FIG. 3(a)), charge-discharge (charge-discharge intervals 1-4) is repeated multiple times, and discharge is carried out at a lower current density than the current density during charging (charge a portion), during each discharge (discharge a) of the multiple charges-discharges. In addition, in the second activation method (refer to FIG. 3(b)), charge-discharge (charge-discharge intervals 1-4) is repeated multiple times, and after each charge-discharge, and after standing idle (idle b) so that the electromotive force can be naturally recovered, discharge (discharge b) is carried out at a lower current density than the current density during the immediately prior charging (charge a). By producing a lithium ion secondary battery using these activation methods, it is possible to increase the amount of lithium ions that return to the positive electrode even when using a solid solution positive electrode active material having $Li_2MnO_3$ as the parent structure, and to promote stabilization of the crystal structure. Therefore, the surface structure is stabilized and the deterioration of the battery can be suppressed.

(2) In the present embodiment, the current density during discharge was set to be less than 0.1 C. Accordingly, it is possible to reduce overvoltage that occurs in the terminal phase of discharge, increase the amount of lithium ions that return to the positive electrode, and promote stabilization of the crystal structure. Accordingly, the surface structure is stabilized and deterioration can be suppressed.

(3) In the present embodiment, the lower limit value of the battery voltage after discharge was set to 3.0-2.0V. This lower limit value of 3.0-2.0V is a voltage before the terminal phase of discharge when resistance begins to increase. Accordingly, by setting the lower limit voltage during discharge to about this degree, it is possible to reduce the amount of lithium ions that must be discharged in the subsequent discharge step. The time required for the entire discharge step can thereby be reduced.

(4) Upon the multiple charges-discharges, it was decided to increase the upper limit potential in a stepwise manner. Accordingly, the surface structure is stabilized and deterioration can be suppressed.

(5) In the present embodiment, the composition of the materials that constitute the negative electrode active material layer used for the lithium ion secondary battery was set to $\alpha$(silicon-based material)+$\beta$(carbon material)+$\gamma$(binder)+$\eta$(conductive assistant) (here, $\alpha$, $\beta$, $\gamma$, and $\eta$ represent the weight % in the negative electrode active material layer, satisfy $\alpha+\beta+\gamma+\eta=100$, $80\leq\alpha+\beta\leq98$, $3\leq\alpha\leq40$, $40\leq\beta\leq95$, $1\leq\gamma\leq10$, $1\leq\eta\leq10$, and the silicon-based material is a material having silicon as the main element). Accordingly, it is possible to achieve a higher capacity, and to suppress deterioration of the battery by using the activation method described above.

(6) Of the above, the silicon-based material having silicon as the main constituent element is $SiO_x$ (x is a number of oxygen atoms that satisfies the valence of Si, and is in the range of $0.5\leq x\leq1.5$), or at least one type selected from a group consisting of $Si_xTi_yGe_zA_a$, $Si_xTi_yZn_zA_a$, $Si_xTi_ySn_zA$, $Si_xSn_yAl_zA_a$, $Si_xSn_yV_zA_a$, $Si_xSn_yC_zA$, $Si_xZn_yV_zA_a$, $Si_xZn_ySn_zA_a$, $Si_xZn_yAl_zA_a$, $Si_xZn_yC_zA_a$, $Si_xAl_yC_zA_a$, $Si_xAl_yNb_zA_a$ (in the formulas, A represent inevitable impurities. Further, x, y, z, and a represent values of weight %, satisfy $0<x<100$, $0<y<100$, $0<z<100$, $0\leq a<0.5$, and $x+y+z+a=100$). It is thereby possible to achieve high capacity.

(7) In the present embodiment, the positive electrode active material layer of the lithium ion secondary battery was set to be a composition that is represented by e (the solid solution positive electrode active material)+f (binder)+g (conductive assistant), in which e, f, and g represent the weight % in the positive electrode active material layer and satisfy $e+f+g=100$, $80\leq e\leq98$, $1\leq f\leq10$, and $1\leq g\leq10$. It is thereby possible to suppress deterioration of the battery by using the activation method described above.

Embodiments and examples applying the present invention were described above, but the present invention is not limited to the above-described embodiments and examples, and various modifications can be made. The present invention is determined by matters defined in the Claims.

The invention claimed is:

1. A method for producing a lithium ion secondary battery comprising a solid solution positive electrode active material represented by the following composition formula:

$Li_{(2-0.5x)}Mn_{1-x}M_{1.5x}O_3$ wherein x satisfies $0<x<1$ and M is a lithium-containing transition metal oxide expressed by $Ni_aCo_bMn_cM1_d$ wherein $0<a\leq0.5$, $0\leq b\leq0.33$, $0<c\leq0.5$, and $0\leq d\leq0.1$ are satisfied, the sum of a, b, c, and d becomes 1, and M1 is an element selected from Li, Al, Zr, Ti, and Nb, the method comprising:

repeatedly charging and discharging the lithium ion secondary battery in charging cycles and discharging cycles, respectively, the discharging of the lithium ion secondary battery being carried out at a lower current density than a current density during the charging of the lithium ion secondary battery, during each of the charging and discharging cycles until the lithium ion secondary battery has been activated, and a lower limit value of a battery voltage during each of the discharging cycles of the lithium ion secondary battery being set to a value of 2.0 V to 3.0 V.

2. The method for producing the lithium ion secondary battery according to claim 1, wherein the discharging of the lithium ion secondary battery at the lower current density is carried out at a constant current density until reaching the lower limit value of the battery voltage by the discharging of the lithium ion secondary battery at the lower current density.

3. The method of producing the lithium ion secondary battery according to claim 1, wherein the lower current density is less than 0.1 C.

4. The method of producing the lithium ion secondary battery according to claim 1, wherein an upper limit potential of each of the repeatedly charging and discharging of the lithium ion secondary battery is increased in a stepwise manner.

5. The method of producing the lithium ion secondary battery according to claim 1, wherein the lithium ion secondary battery comprises a negative electrode active material layer represented by $\alpha$ (silicon-based material)+$\beta$ (carbon material)+$\gamma$ (binder)+$\eta$ (conductive assistant), where $\alpha$, $\beta$, $\gamma$, and $\eta$ represent a weight % in the negative electrode active material layer, satisfy $\alpha+\beta+\gamma+\eta=100$, $80\leq\alpha+\beta<98$, $3\leq\alpha\leq40$, $40\leq\beta\leq95$, $1\leq\gamma\leq10$, $1\leq\eta\leq10$, and the silicon-based material is a material having silicon as a main element.

6. The method of producing the lithium ion secondary battery according to claim 5, wherein the silicon-based material is $SiO_x$ wherein x is a number of oxygen atoms that satisfies a valence of Si, and is in a range of $0.5\leq x\leq1.5$), or at least one type selected from a group consisting of $Si_xTi_yGe_zA_a$, $Si_xTi_yZn_zA_a$, $Si_xTi_ySn_zA$, $Si_xSn_yAl_zA_a$, $Si_xSn_yV_zA_a$, $Si_xSn_yC_zA$, $Si_xZn_yV_zA_a$, $Si_xZn_ySn_zA_a$, $Si_xZn_yAl_zA_a$, $Si_xZn_yC_zA_a$, $Si_xAl_yC_zA_a$, $Si_xAl_yNb_zA_a$ where A represents inevitable impurities and x, y, z, and a represent values of weight % satisfying $0<x<100$, $0<y<100$, $0<z<100$, $0\leq a<0.5$, and $x+y+z+a=100$).

7. The method of producing the lithium ion secondary battery according to claim 1, wherein the lithium ion secondary battery comprises a positive electrode active material layer represented by e (solid solution positive electrode active material)+f (binder)+g (conductive assistant), where e, f, and g represent the weight % in the positive electrode active material layer and satisfy $e+f+g=100$, $80\leq e\leq98$, $1\leq f\leq10$, and $1\leq g\leq10$.

8. The method of producing the lithium ion secondary battery according to claim 1, wherein an upper limit value of the battery voltage during each of the charging cycles of the lithium ion secondary battery is set to a value of greater than or equal to 4.45 V.

9. The method of producing the lithium ion secondary battery according to claim 1, wherein
the repeatedly charging and discharging the lithium ion secondary battery in charging cycles and discharging cycles comprises more than two charging and discharging cycles, and
the discharging of the lithium ion secondary battery at the lower current density than the current density during the charging of the lithium ion secondary battery is performed during each of the more than two charging and discharging cycles.

10. The method of producing the lithium ion secondary battery according to claim 1, wherein
the lower current density is 0.02 C or less.

11. The method of producing the lithium ion secondary battery according to claim 1, wherein
a theoretical capacity of the lithium ion secondary battery once the lithium ion secondary battery has been activated is 95% or more.

12. The method of producing the lithium ion secondary battery according to claim 1, wherein
the lithium ion secondary battery is activated by the repeated charging and discharging of the lithium ion secondary battery in charging cycles and discharging cycles, respectively.

* * * * *